United States Patent [19]

Maeda et al.

[11] Patent Number: 4,885,960
[45] Date of Patent: Dec. 12, 1989

[54] CONTROL SYSTEM FOR AUTOMATIC TRANSMISSION

[75] Inventors: Hiroaki Maeda, Toyota; Masahiko Nakamura, Okazaki, both of Japan

[73] Assignee: Aisin Seiki Kabushiki Kaisha, Kariya, Japan

[21] Appl. No.: 238,610

[22] Filed: Aug. 31, 1988

[30] Foreign Application Priority Data

Sep. 7, 1987 [JP] Japan .................................. 62-223715

[51] Int. Cl.$^4$ ....................... B60K 41/22; B60K 41/18
[52] U.S. Cl. ........................................ 74/866; 74/877; 364/424.1
[58] Field of Search ................. 74/866, 878, 865, 877; 369/424.1

[56] References Cited

U.S. PATENT DOCUMENTS

| | | | |
|---|---|---|---|
| 4,513,638 | 4/1985 | Nishikawa et al. | 74/877 X |
| 4,513,639 | 4/1985 | Hiramatsu | 74/866 |
| 4,644,826 | 2/1987 | Kubo et al. | 74/866 |
| 4,648,289 | 3/1987 | Kubo et al. | 74/866 |
| 4,653,622 | 3/1987 | Miyake | 74/866 X |
| 4,694,709 | 9/1987 | Kikuchi et al. | 364/424.1 X |
| 4,730,708 | 3/1988 | Hamano et al. | 74/866 X |
| 4,784,020 | 11/1988 | Hamano et al. | 74/866 |

FOREIGN PATENT DOCUMENTS

| | | | |
|---|---|---|---|
| 0060347 | 6/1985 | Japan | 74/866 |
| 0060354 | 6/1985 | Japan | 74/866 |

*Primary Examiner*—Rodney H. Bonck
*Assistant Examiner*—William Gehris
*Attorney, Agent, or Firm*—Burns, Doane, Swecker & Mathis

[57] ABSTRACT

A creep phenomenon of an automotive vehicle is prevented by an arrangement which is provided with an anti-creep mode which is operative to change the gear automatically to a speed range having a relatively low speed reduction ratio when the vehicle is at rest. A double engagement within the transmission and resulting oscillations which would occur when a special operation is performed is prevented. At this end, a time delay is provided before shifting to the anti-creep mode when the vehicle is at rest and the throttle valve opening of an engine is equal to or less than a given value.

4 Claims, 7 Drawing Sheets

CONTROL SYSTEM FOR AUTOMATIC TRANSMISSION

BACKGROUND OF THE INVENTION

The invention relates to a control system for an automatic transmission as may be used in an automotive vehicle, and in particular, to a control system for an automatic transmission in which the occurrence of a creep phenomenon is prevented when a load (a car body) is at rest and a driver is not willing to start the vehicle.

In the general use of an automatic transmission for an automotive vehicle, for example, the vehicle will free to move when a manual shift lever is turned to a position corresponding to a range which permits a running of the vehicle, for example, in a drive (D) range if the vehicle is at rest and the driver is not willing to start the vehicle or when an accelerator pedal assumes its off position unless a braking operation is applied intentionally. This is caused by a drive torque appearing at the output shaft of the transmission during the idling mode of an engine which will be greater than necessary inasmuch as the speed reduction ratio of the transmission is set at its maximum (to select a first speed range) when the vehicle is at rest, and is commonly referred to as a creep phenomenon. When the vehicle is subject to a creep phenomenon, it is necessary to apply the brake and maintain it operative as long as the vehicle remains at rest, forcing a driver to perform a troublesome operation. To accommodate for this, there is disclosed a technique in Japanese Laid-Open Patent Application No. 83,526/1973 in which the occurrence of a creep phenomenon is prevented by automatically shifting to a second or a higher speed range whenever the vehicle is stopped, thereby reducing the reduction ratio to reduce the magnitude of the output torque.

In the conventional practice, the occurrence of a creep phenomenon is prevented as follows: Specifically, when a vehicle comes to a stop and a throttle opening is reduced to a given value or less (corresponding to an off condition of an accelerator pedal), it is determined that a driver is not willing to start the vehicle, and a shift occurs from a first to a second (or a third) speed range. Subsequently, when the throttle opening increases to a given value (corresponding to an on condition of the accelerator pedal), it is determined that the driver is willing to start the vehicle, and a shift is made automatically from the second to the first speed range, thereby increasing the drive torque upon starting the vehicle.

Such control presents no problem whatsoever in a normal operation. However, it is found that a problem arises when a particular operation is performed. Thus, if a brake pedal is depressed while depressing the accelerator pedal when the vehicle is at rest, and the accelerator pedal is then returned without allowing the vehicle to run, an associated control system will shift from the second to the first speed range immediately after the depression of the accelerator pedal, and will shift from the first to the second speed range immediately upon returning the accelerator pedal. In such instance, a special double engagement occurs within the transmission, the detail of which will be described later, thereby giving rise to oscillations of the output shaft of the transmission. This is inevitable in an automatic transmission of a general construction which employs a one way clutch.

SUMMARY OF THE INVENTION

It is an object of the invention to eliminate the occurrence of double engagement, and hence resulting oscillations as mentioned above, in the event a driver performs a particular driving operation.

The above object is accomplished in accordance with the invention by inhibiting a shift to a speed range of a lower reduction ratio when the travelling speed of the vehicle is substantially equal to zero and an energization level of a drive source (such as a throttle opening of an engine) is equal to or less than a given value at least until a given time interval passes in order to prevent the occurrence of a creep phenomenon.

Briefly, a double engagement within the transmission occurs in the following manner: Specifically, when a driver depresses an accelerator pedal while he is depressing a brake pedal, a drive torque of an increased magnitude will be applied to the input shaft of the transmission while an output shaft thereof remains fixed. If a shift to the first speed range occurs at this time, the engagement of the one way clutch causes an output gear of the transmission to be fixed, whereby the drive torque applied from the engine causes a torsion to occur within the transmission. As the driver now releases the accelerator pedal, a shift to the second speed range occurs, whereupon a braking unit within the transmission becomes operative immediately, thus fixing the input gear of the transmission. As a consequence, the input gear will become fixed before the torsion which is produced within the transmission is restored, preventing the one way clutch from being disengaged. This causes a double engagement, giving rise to oscillations.

However, in accordance with the invention, there is provided a given time interval during which a shift operation is inhibited before a shift to a speed range (for example, a second speed range) of a lower reduction ratio takes place. Thus, an input torque from the drive source will be allowed to be sufficiently reduced to thereby allow the torsion produced within the transmission to be restored, thus assuring that the one way clutch is positively disengaged, before a shift to a speed range of the lower reduction ratio takes place, thus avoiding the occurrence of double engagement which would otherwise give rise to oscillations.

Other objects and features of the invention will become apparent from the following description of an embodiment thereof with reference to the drawings.

DESCRIPTION OF PREFERRED EMBODIMENT

Figure 2:
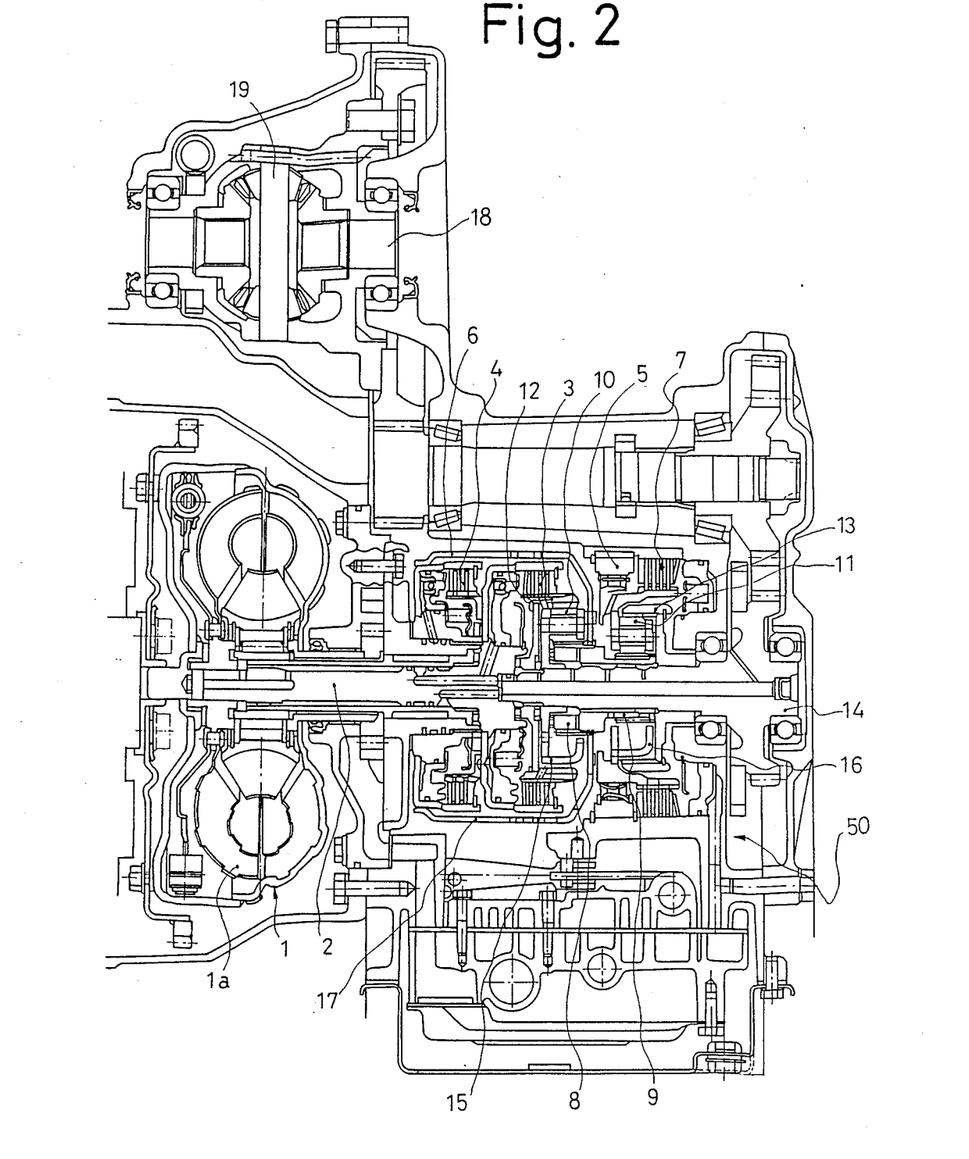
FIG. 2 is a front view, partly in longitudinal section, of a transmission mechanism of one form of automatic transmission in which the invention is embodied.

FIG. 2 shows a mechanical construction of one form of automatic transmission incorporating the invention and which may be used in an automotive vehicle. The construction and the operation of the transmission mechanism will be initially described with reference to FIG. 2.

A crankshaft of an engine, not shown, is connected to a torque converter 1 having a turbine 1a which is coupled to an input shaft 2 of a planetary gear unit 50. The planetary gear unit 50 includes, as control elements, a front clutch 3, a direct clutch 4, a one way clutch 5, and a pair of brakes 6 and 7, and also includes gears including a front sun gear 8, a rear sun gear 9, a front planetary gear pinion 10, a rear planetary gear pinion 11, a front planetary ring gear 12 and a rear planetary ring gear 13.

The front sun gear 8 and the rear sun gear 9 are constructed in an integral manner and are rotatably disposed in surrounding relationship with an output shaft 14. The front planetary gear pinion 10 is in meshing engagement with the outer periphery of the front sun gear 8 while the rear planetary gear pinion 11 is in meshing engagement with the outer periphery of the rear sun gear 9. Both the front and the rear planetary ring gear 12 and 13 are formed with teeth around their inner periphery which mesh with the front and the rear planetary gear pinion 10 and 11, respectively. In this manner, the front planetary gear pinion 10 is disposed between the outer periphery of the front sun gear 8 and the inner periphery of the front planetary ring gear 12 and is maintained in meshing engagement therewith. The rear planetary gear pinion 11 is disposed between the outer periphery of the rear sun gear 9 and the inner periphery of the rear planetary ring gear 13 and is maintained in meshing engagement therewith. It is to be understood that the direction of rotation of rotating members will be referred to, in the description to follow, as when viewed from left to right in FIG. 2.

Initially assume that a gear for the first speed range (having a maximum reduction ratio) is selected. Under this condition, the front clutch 3 is engaged while the direct clutch 4 is disengaged, with the brake 6 being off. Accordingly, the clockwise drive torque applied to the input shaft 2 is transmitted through the front clutch 3 to the front planetary ring gear 12, which rotates clockwise. The clockwise rotation is transmitted to a front carrier 15 which supports the front planetary gear pinion 10 which in turn meshes with the gear 12. On the other hand, the front sun gear 8 is subject to a counter-clockwise rotation from the pinion 10, which rotation is transmitted through the rear sun gear 9 to the rear planetary gear pinion 11, tending to rotate a rear carrier 16 which supports the pinion 11 counter-clockwise. However, the one way clutch 5 is engaged in response to a counter-clockwise rotation, acting to block the rotation of the rear carrier 16. This causes the pinion 11 to rotate clockwise, thus driving its meshing rear planetary ring gear 13 clockwise. Since the front carrier 15 and the rear planetary ring gear 13 are coupled to an output shaft 14, the latter is driven clockwise. The reduction ratio in this instance is equal to 2.7 (first speed range).

Assume then that a gear for the second speed range is selected. In this instance, the front clutch 3 is engaged while the direct clutch 4 is disengaged, with the brake 6 being on. Accordingly, the clockwise drive torque applied to the input shaft 2 is transmitted through the front clutch 3 to the front planetary ring gear 12, which therefore rotates clockwise. In this manner, a clockwise rotation is transmitted to the front carrier 15 which supports the front planetary gear pinion 10 meshing with the gear 12. On the other hand, the front sun gear 8 is subject to counter-clockwise rotation from the pinion 10, but its rotation is blocked by the operation of the brake 6, whereby the rotation is not transmitted to the rear planetary gear pinion 11. Thus, the drive is transmitted to the output shaft 14 as a result of a rotation of the front carrier 15 which results from the revolution of the front planetary gear pinion 10, allowing the output shaft to rotate clockwise. The reduction ratio in this instance is equal to 1.5 (second speed range).

Assume that a gear for the third speed range is selected. In this instance, both the front clutch 3 and the direct clutch 4 are engaged. Thus, the front sun gear 8 and the front planetary ring gear 12 are driven at the same speed, whereby the front planetary gear pinion 10 is locked. Hence, the front carrier 15 rotates at the same speed as the input shaft 2, as is the output shaft 14. Thus, the reduction ratio is equal to 1.

Assume that a gear for a reverse operation is selected. In this instance, the front clutch 3 is disengaged while the direct clutch 4 is engaged, with the brake 7 being on. Accordingly, a clockwise drive torque applied to the input shaft 2 is transmitted through a drum 17 to the rear sun gear 9. This tends to rotate the rear carrier 16 which supports the rear planetary gear pinion 11 clockwise. However, since the brake 7 is operative, the resulting rotation of the rear carrier 16 is blocked. Accordingly, the rear planetary gear pinion 11 rotates counter-clockwise, thus driving the rear planetary ring gear 13 counter-clockwise. As a consequence, the output shaft 14 which is coupled to the gear 13 is driven in the counter-clockwise direction.

Oscillations may be developed in a vehicle which employs a transmission of the kind described if a special shift operation is performed. This occurs when the output shaft 14 is forcedly braked by operating a foot brake and/or side brake of a vehicle or when the output shaft 14 is under a high load as when running on an up grade, if a throttle valve is opened (or an accelerator pedal is in its on condition) to select a gear for the first speed range, followed by closing the throttle valve (or the accelerator pedal being in its off condition) simultaneously with an up shift to the second speed range. This situation may take place in an automatic transmission which is provided with an anti-creep function in which a gear for the second or higher speed range can be selected under the condition that the vehicle is at rest. Specifically, if the accelerator pedal is in its on condition while the vehicle is at rest, a shift to the first speed range is achieved by engaging the front clutch 3 and turning the brake 6 off. Under this condition, the rear carrier 16 tends to rotate counter-clockwise as mentioned previously, and hence the one way clutch 5 is engaged. A drive torque of an increased magnitude is applied to the input shaft 2, but because an axle shaft 18 and/or differential gear 19 coupled to the output shaft 14 is forcedly held stationary, a torsional deformation occurs within the transmission mechanism. If the accelerator pedal is released now and an up shift to the second speed range takes place immediately, the brake 6 is turned on to hold the drum 17 stationary while simultaneously maintaining the one way clutch 5 in its engaged condition due to the restoring force of the torsional deformation which is applied from the output shaft 14. This results in a double engagement by the brake 6 and the one way clutch 5. The drive torque applied to the input shaft 2 causes the front planetary ring gear 12 to rotate clockwise slightly, but because the front sun gear 8 is stationary, the front carrier 15 is driven to rotate clockwise, with its torque being transmitted through the output shaft 14 to the rear planetary ring gear 13 to rotate it clockwise. Because the rear sun gear 9 is stationary, the rear carrier 16 rotates clockwise slightly. This causes the one way clutch 5 to be disengaged temporarily.

Upon disengagement of the one way clutch 5, there occurs a shift to the second speed range, and hence the reduction ratio decreases from 2.7 to 1.5, thus reducing the magnitude of a drive torque applied to the output shaft 14. This allows the restoring force of the torsional deformation which is applied from the axle shaft 18 to rotate the output shaft 14 in the reverse direction or counter-clockwise slightly. Consequently, the rear planetary ring gear 13 rotates counter-clockwise, causing the rear planetary gear pinion 11 to rotate the rear carrier 16 counter-clockwise. This re-establishes the engagement of the one way clutch 5.

While the rear carrier 16 remains stationary, the rear planetary ring gear 13 rotates counter-clockwise and the rear planetary gear pinion 11 rotates clockwise, with consequence that the rear sun gear 9 rotates counter-clockwise relative to the drum 17 which is held stationary by the brake 6 by an amount corresponding to the rattling. This increases the reduction ratio of the transmission mechanism to 2.7, whereby the drive torque applied to the output shaft 14 again increases in magnitude, and various parts move in a direction to increase the magnitude of the torsional deformation with result that the rear planetary ring gear 13 rotates clockwise, acting through the rear planetary gear pinion 11 to rotate the rear carrier 16 clockwise, thereby causing the one way clutch 5 to be disengaged temporarily again. The described operation is repeated, giving rise to oscillations of the engine and also an oscillation in the number of revolutions of the transmission mechanism. This causes a variation in the load upon the engine and the mount of the transmission, causing an oscillation of the vehicle.

Figure 3A:
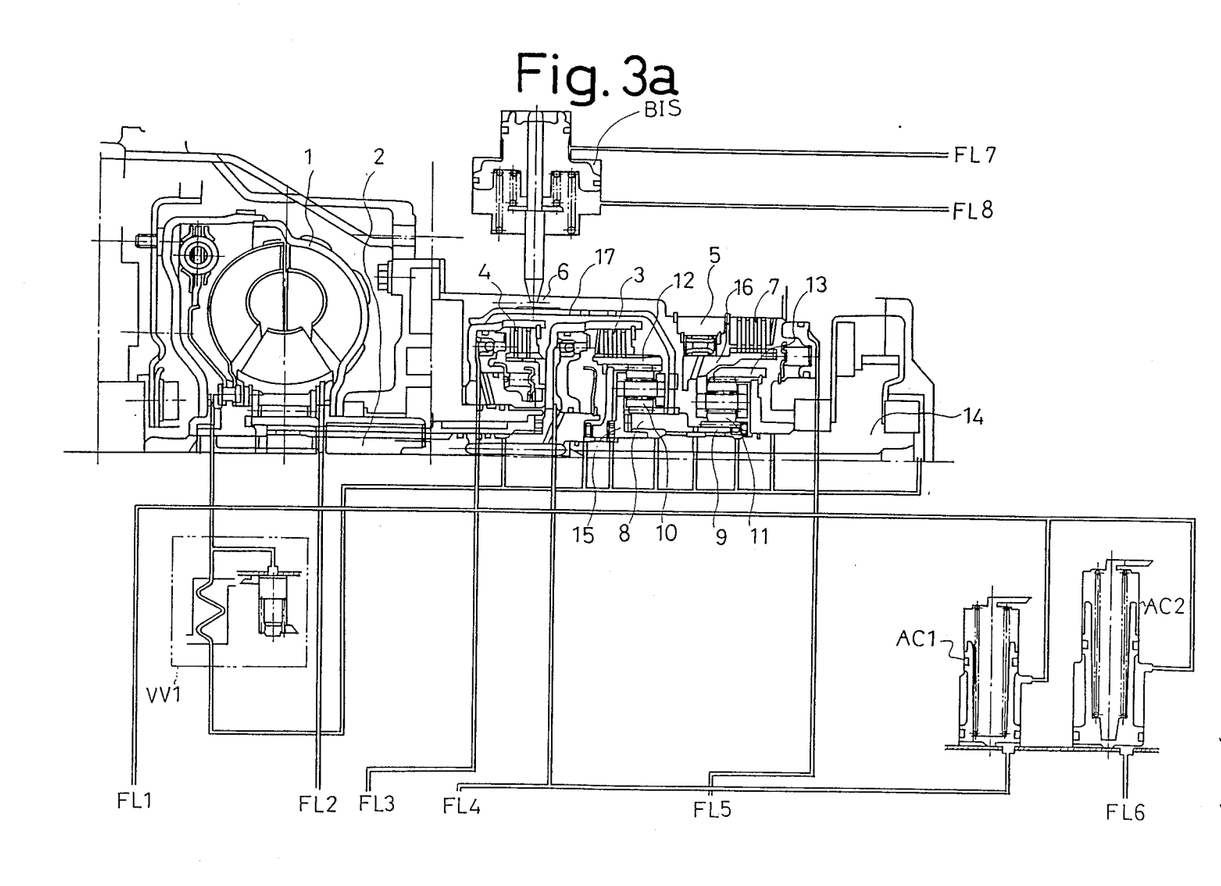
FIGS. 3a and 3b are block diagrams illustrating the arrangement of a hydraulic unit used in the transmission mechanism shown in FIG. 2.
Figure 3B:
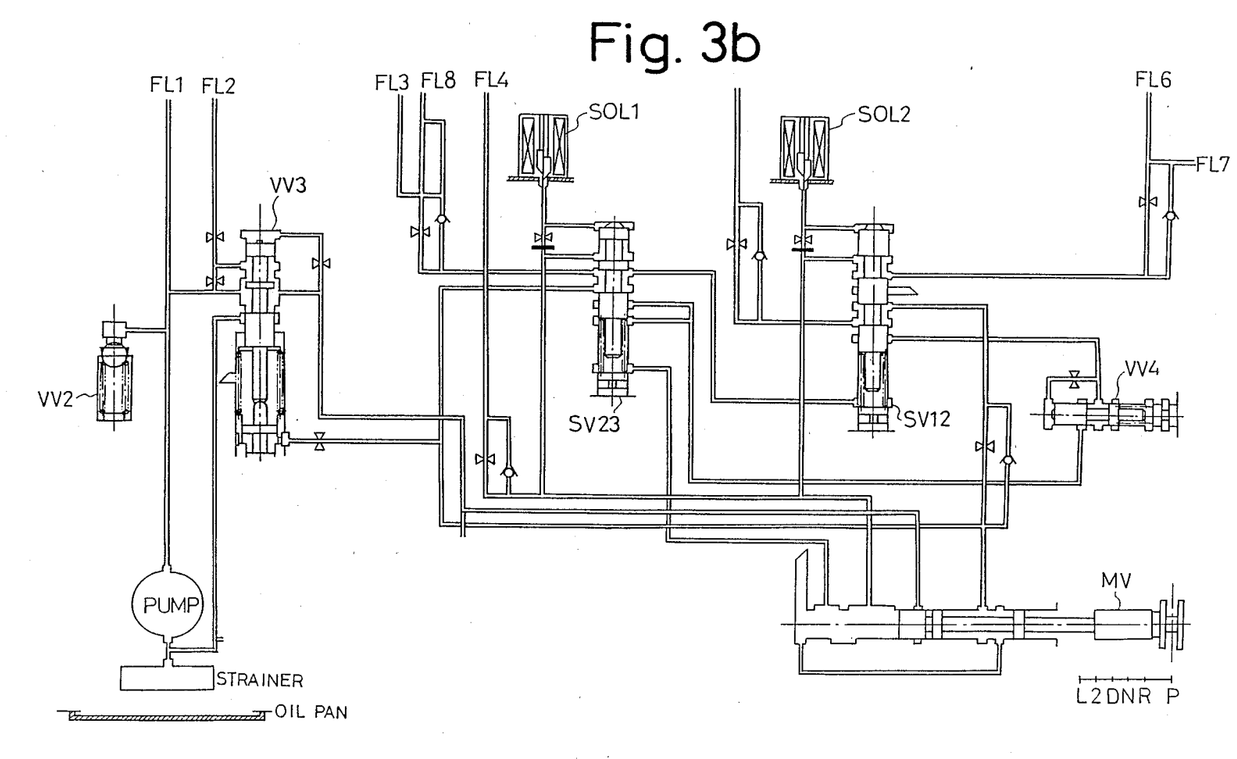

The present embodiment prevents the occurrence of such oscillations by an electrical control to be described later. FIGS. 3a and 3b illustrate a hydraulic circuit which controls the transmission mechanism shown in FIG. 2. Specifically, the hydraulic circuit includes a cooler bypass valve VV1, a pressure relief valve VV2, a primary regulator valve VV3, a low coast modulator valve VV4, a 1-2 shift valve SV12, a 2-3 shift valve SV23, shift control solenoid valves SOL1, SOL2, a manual valve MV and the like. BlS represents a servo mechanism which constitutes the brake 6. The manual valve MV is operated in interlocked relationship with the position of a shift lever which is disposed adjacent to a driver's seat, and has six ranges, P, R, N, D, 2 and L. The hydraulic circuit is arranged to control the transmission mechanism mentioned above in accordance with a combination of a selected range of the manual valve MV and on/off conditions of the shift control solenoid valves SOL1 and SOL2. The hydraulic circuit is conventional in itself, and hence its construction and operation will not be described in detail.

Figure 4:
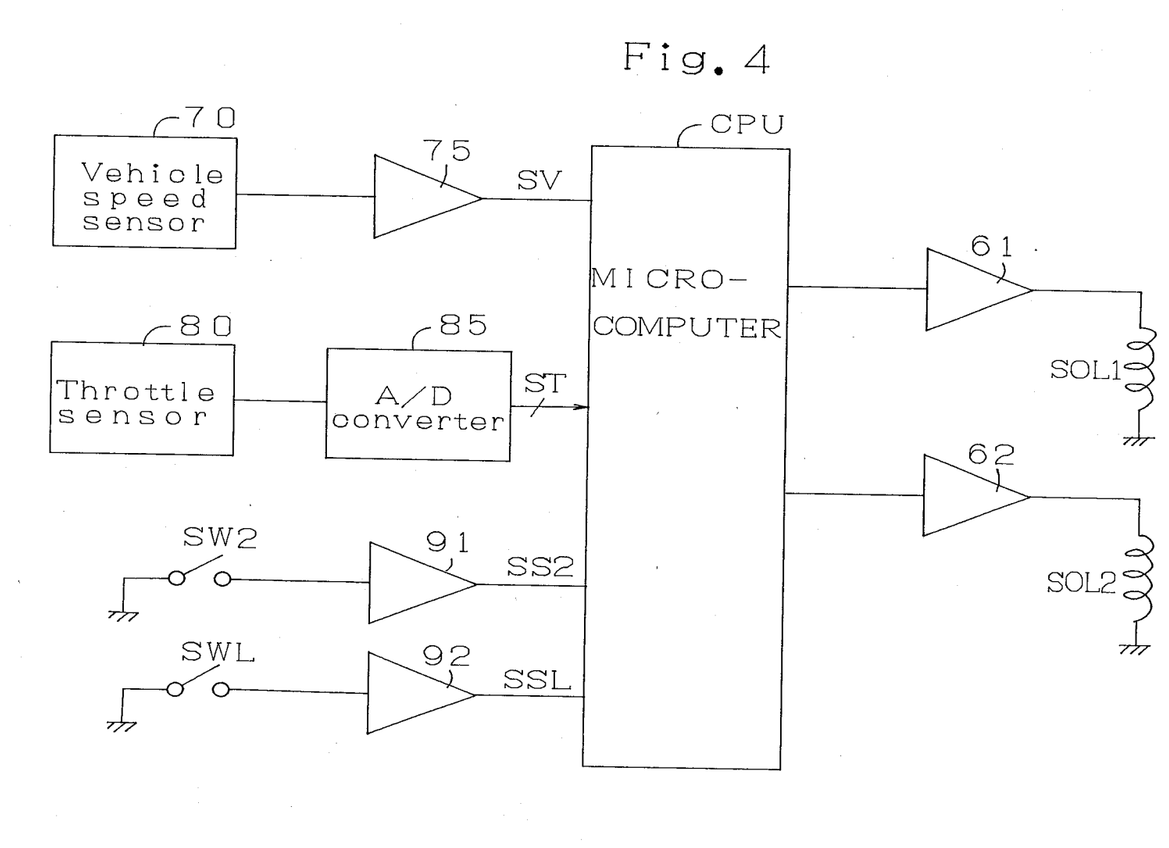
FIG. 4 is a block diagram of an electrical system which controls solenoid valves SOL1 and SOL2 shown in FIG. 3b.

FIG. 4 shows an electrical circuit which controls the hydraulic circuit shown in FIGS. 3a and 3b. Referring to FIG. 4, the electrical circuit includes a microcomputer CPU which controls the shift control solenoid valves SOL1 and SOL2, each of which is connected to an output port of the microcomputer CPU through a respective driver 61 or 62. A vehicle speed sensor 70 delivers a pulse signal having a number of pulses which depends on the degree of rotation of a speedometer cable. Accordingly, a vehicle speed can be determined on the basis of a repetition frequency of the pulse signal measured. The sensor 70 has an output terminal which is connected through a signal processor 75 to an input port of the microcomputer CPU to feed a vehicle speed signal SV thereto. A throttle sensor 80 delivers an analog electrical signal which varies with the opening of the throttle valve. This signal is converted into a digital signal by an A/D converter 85 to feed a throttle opening signal ST to an input port of the microcomputer CPU. A pair of switches SW2 and SWL are operated in interlocked relationship with the position of a shift lever which is disposed adjacent to a driver's seat. Specifically, the switch SW2 is turned on when the shift lever is at its 2-range, and is turned off otherwise. The switch SWL is turned on when the shift lever is at its L-range, and is turned off otherwise. Accordingly, when the shift lever is at its 2-range, the switch SW2 is turned on while the switch SWL is turned off. When the shift lever is at its L-range, the switch SWL is turned on while the switch SW2 is turned off. The both switches SW2 and SWL are turned off when the shift lever is located at P (parking), R (reverse) N (neutral) or D (drive)-range. The switches SW2 and SWL are connected through signal processors 91 and 92, respectively, to individual input ports of the microcomputer CPU.

Figure 1:
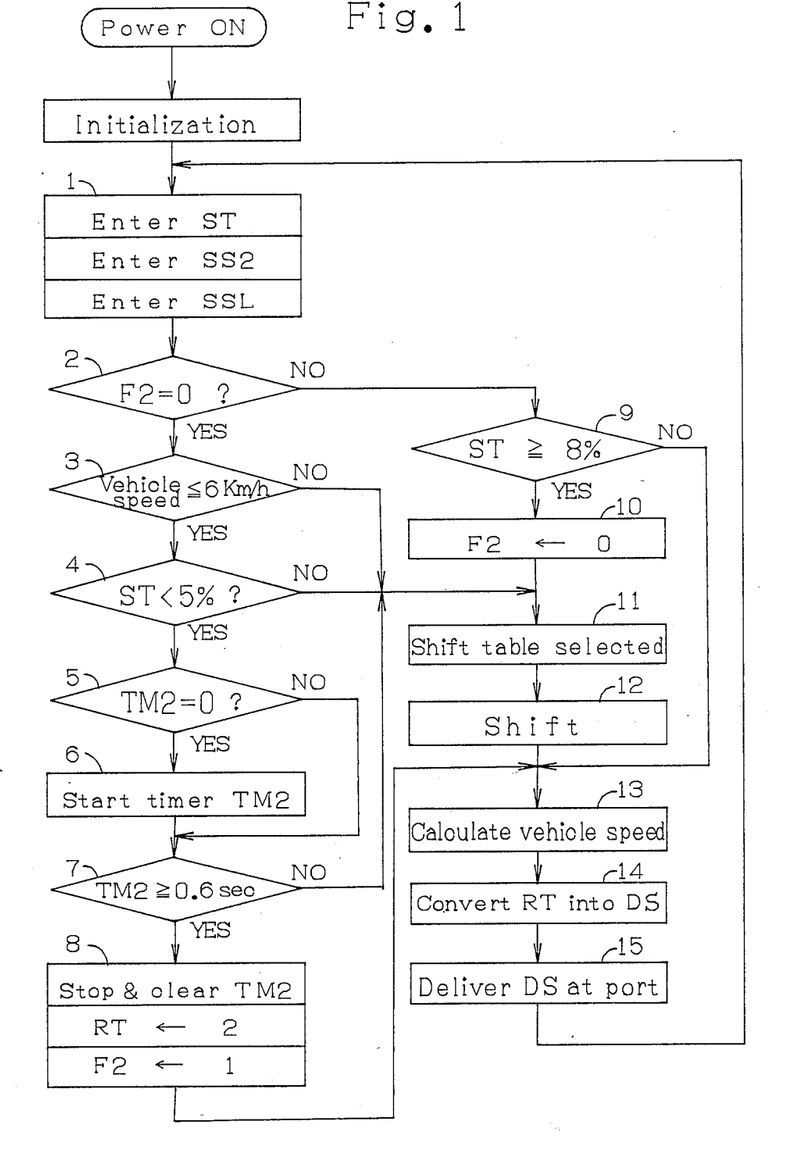
FIG. 1 is a flow chart illustrating a general operation of a CPU shown in FIG. 4.

FIG. 1 illustrates the summary of operation of the microcomputer CPU shown in FIG. 4. The operation of the microcomputer CPU will be described with reference to FIG. 1. When the power supply is turned on, an initialization takes place. Specifically, an internal memory of CPU is cleared, various output ports are preset to their initial conditions, timers and interrupts are established in a proper manner and various parameters are reset. While not shown, an interrupt request to the microcomputer CPU is developed on each leading edge of the vehicle speed signal SV after the completion of the initialization. When an interrupt request occurs, CPU executes an interrupt processing operation, not shown, and increments a vehicle speed register (internal memory). A timer (TM1) starts upon completion of the initialization.

At step 1, the throttle opening signal ST, the shift position signals SS and SSL are supplied and stored in associated memories.

At step 2, the status of a flag F2 is examined, and the subsequent program depends on this status. "1" and "0" of flag F2 indicate an on and an off condition of an anti-creep mode. Generally, when a vehicle speed is very low, the deceleration is at its maximum, and the gear for the first speed range which allows a drive torque of an increased magnitude to be obtained is selected. However, in an anti-creep mode, a gear for the second speed range is selected even though the vehicle speed is equal to zero, thus intentionally reducing the drive torque to prevent the occurrence of a creep phenomenon.

At step 3, the vehicle speed detected is compared against 6 km/h, and the program proceeds to either step 4 or 11 depending on the relative magnitude.

At step 4, the throttle opening detected is compared against 5%, and the program then proceeds to either step 5 or 11 depending on the relative magnitude.

At step 5, the count in the timer TM2 is examined. Under the initial condition, the timer TM2 is quiescent under its initial condition and has a count of 0. The program proceeds to step 6 when the timer TM2 has the count of 0, and proceeds to step 7 otherwise.

At step 6, a counting operation by the timer TM2 is started.

At step 7, the count of the timer TM2 is examined. The program proceeds to step 8 if the content of the timer is equal to or greater than 0.6 second, and proceeds to step 11 otherwise.

At step 8, the timer TM2 is reset to its initial condition, 2 is stored in a shift register RT and the flag F2 is set to "1".

At step 9, the throttle opening ST detected is compared against 8%, and the program proceeds to either step 10 or 13 depending on the relative magnitude.

At step 10, the flag F2 is cleared to "0".

Figure 5A:
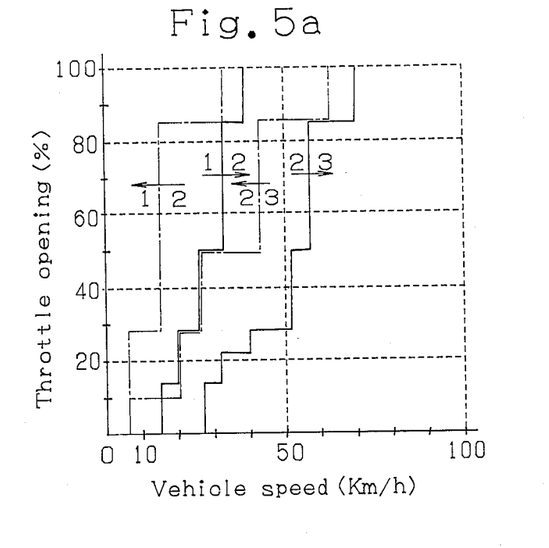
FIGS. 5a, 5b and 5c graphically illustrate several shift schedules in different speed ranges.
Figure 5B:
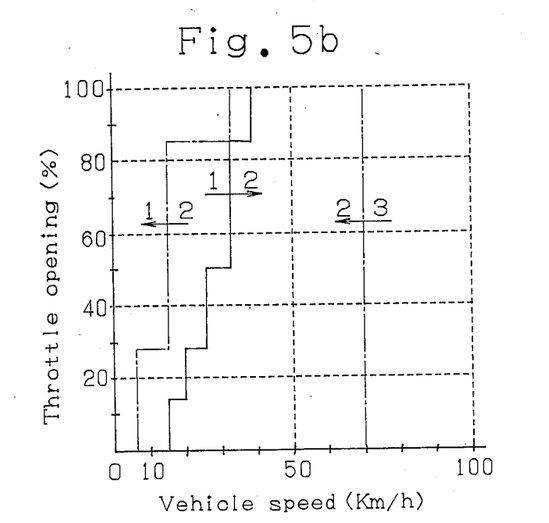
Figure 5C:
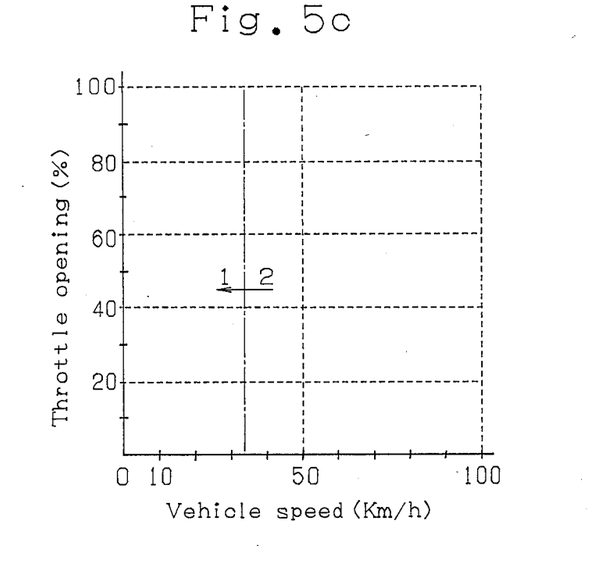

At step 11, a shift table is selected. Specifically, a particular speed range selected by a shifting operation by the automatic transmission is determined according to a given schedule which depends on the prevailing speed range, the vehicle speed and the throttle opening, but a schedule illustrated graphically in FIG. 5a is selected for ranges of the shift lever other than "2" or "L". When the shift lever is at its 2-range, a schedule graphically illustrated in FIG. 5b is selected while a schedule graphically illustrated in FIG. 5c is selected when the shift lever is at its L-range. It is to be understood that data representing the schedules illustrated in FIGS. 5a, 5b and 5c are stored as tables in different areas of a memory. Accordingly, at step 11 a particular table corresponding to a schedule which is to be referred to is selected depending on the position of the shift lever or a combination of the status of signals SS2 and SSL. It is to be noted in FIGS. 5a to 5c that a schedule representing a shift from a lower speed range (having a greater reduction ratio) to a higher speed range is indicated in solid lines while a schedule corresponding to a shift from a higher to a lower speed range is indicated in phantom lines.

At step 12, a reference is made to a table corresponding to the schedule selected at step 11, and if it is found necessary to perform a shift, the content of the shift register RT is updated on the basis of the schedule. The content of the shift register RT is either 1, 2 or 3, meaning that a gear for the first, the second or the third speed range is selected.

At step 13, a reference is made to the count in the timer TM1, and each time a given time limit is reached, the timer TM1 is cleared, and the vehicle speed is calculated on the basis of the content (pulse count) of the vehicle speed register.

At step 14, data DS which is used to control the solenoid valves SOL1 and SOL2 is produced in accordance with the content of the shift register RT. This operation is executed by reference to a conversion table which is previously defined in a memory and having a content as illustrated in the table 1 below.

TABLE 1

| content of RT (speed range to shift) | content of DS | |
|---|---|---|
| | (SOL1) | (SOL2) |
| 1 | 1 (ON) | 0 (OFF) |
| 2 | 1 (ON) | 1 (ON) |
| 3 | 0 (OFF) | 1 (ON) |

At step 15, data DS which is produced at step 14 is delivered through a given output port for controlling the solenoid valves SOL1 and SOL2.

Upon completion of step 15, the program returns to step 1, thus repeatedly executing a given sequence of processing steps sequentially in a loop fashion.

When the vehicle is running in a normal manner, a loop including the steps 1 - 2 - 3 - 11 - 12 - 13 - 14 - 1 is executed repeatedly, performing a shift control so as to conform to one of the schedules illustrated in FIGS. 5a, 5b and 5c.

When the vehicle is at rest, and the driver is not willing to start the vehicle speed or when the vehicle is less than a given value and the throttle opening is also less than a given value, an anti-creep mode which is different from a normal shift schedule is entered. Specifically, when a vehicle speed equal to or less than 6 km/h is detected at step 3, and a throttle opening less than 5% is detected at step 4, the program proceeds to step 6 where the timer TM2 is started. When a timer interval of 0.6 second passes since the start of the timer TM2, the program proceeds to step 8 where the content of the shift register RT is forcedly changed to "2" (to select the second speed range) while setting the flag F2 to "1". The program then proceeds from step 2 to step 9, and since the throttle opening is less than 8%, the steps 11 and 12 are skipped over. Accordingly, a gear for the second speed range is selected even though the vehicle is at rest.

The anti-creep mode is terminated when a driver performs a starting operation or depresses the accelerator pedal. Thus, as the accelerator pedal is depressed to increase the throttle opening, the throttle opening signal ST will be equal to or greater than 8% at step 9, and hence the program proceeds to step 10 where the flag F2 is cleared to "0" before executing the operation of the steps 11 and 12. In this manner, a control is based on a normal shift schedule.

As mentioned previously, in a usual transmission mechanism of an automatic transmission, if the accelerator pedal is depressed to select a gear for the first speed range and is then released to select a gear for the second speed range immediately while an output from the transmission is being braked, a double engagement occurs within the transmission mechanism to give rise to oscillations. To avoid the occurrence of such oscillations, two means are employed in the present embodiment.

Specifically, in the above example, when the vehicle speed is equal to or less than 6 km/h and the throttle opening has been reduced to less than 5%, the timer TM2 is used to define a 0.6 second delay period, and the operation is switched to the anti-creep mode after the delay period has passed. This prevents a shifting to a gear for the second speed range until the delay period passes if the accelerator pedal is depressed to select a gear for the speed range and is then released during the time an output from the transmission is being braked. Accordingly, the magnitude of an input torque applied to the transmission mechanism during the delay period will be reduced, but because the brake 6 is disengaged, the front sun gear 8 and the rear sun gear 9 are free to rotate, allowing a restoring operation from a torsional deformation which is produced within the transmission mechanism, thus disengaging the one way clutch 5 to prevent a double engagement.

Alternative means resides in the provision of a hysteresis in the threshold value of a throttle opening which is used when entering the anti-creep mode and when terminating such mode. The use of such hysteresis permits a threshold value of the throttle opening upon entering the anti-creep mode to be sufficiently reduced. In the present example, a threshold value is chosen to be less than 5%, thus avoiding the occurrence of a double engagement. Specifically, if the accelerator pedal is depressed to select a gear for the first speed range and is then released while an output from the transmission is being braked, a shift to the second speed range does not take place unless the throttle opening is sufficiently reduced. In this manner, the magnitude of an input torque applied to the transmission mechanism is reduced before a gear for the second speed range is selected, allowing a restoring from the torsional deformation within the transmission mechanism to take place, thereby disengaging the one way clutch 5 to prevent a double engagement.

A threshold value for the throttle opening when terminating the anti-creep mode is chosen to be sufficiently high, thus eliminating the likelihood that the anti-creep mode may be terminated independently from the intent of a driver in response to a slight variation in the idling level of an engine or in response to a small variation in the throttle opening which may be caused by an unintentional depression, to a lesser extent, of the accelerator pedal by a driver.

What is claimed is:

1. A control system for an automatic transmission including a transmission mechanism interposed between a drive source which is disposed onboard a vehicle and a drive output shaft and in which the transmission mechanism is automatically shifted to a second speed range other than first speed range which has a maximum speed reduction ratio when the vehicle is substantially at rest and the drive source is energized at a level equal to or less than a given level; the control system comprising first detecting means for detecting whether the vehicle is substantially at rest, second detecting means for detecting the level at which the drive source is energized, and electronic control means for inhibiting a shaft to the second speed range when the vehicle is substantially at rest and the energization level of the drive source has been recognized to be equal to or less than a given value until after a given time interval passes, said time interval being equal to or larger than a time required for performing a restoring operation from a torsional deformation which is produced within the transmission mechanism.

2. A control system according to claim 1 in which the first detecting means comprises means for detecting a vehicle speed, and the second detecting means comprises means for detecting a throttle opening of the drive source.

3. A control device according to claim 1 in which said control means returns the transmission mechanism to the first speed range automatically when the energization level of the drive source changes to a second level higher than the first level.

4. A control system according to claim 3 in which the first detecting means comprises means for detecting a vehicle speed, and the second detecting means comprises means for detecting a throttle opening of the drive source.

* * * * *